United States Patent
Patel (10) Patent No.: US 9,021,134 B1
(45) Date of Patent: Apr. 28, 2015

(54) MEDIA STREAM TRANSPORT CONVERSION WITHIN AN INTERMEDIATE NETWORK DEVICE

(75) Inventor: Piyush Patel, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 686 days.

(21) Appl. No.: 11/368,066

(22) Filed: Mar. 3, 2006

(51) Int. Cl.
*G06F 15/16* (2006.01)
*H04L 29/06* (2006.01)

(52) U.S. Cl.
CPC .............. *H04L 69/08* (2013.01); *H04L 69/165* (2013.01); *H04L 65/105* (2013.01); *H04L 65/1069* (2013.01); *H04L 65/1083* (2013.01)

(58) Field of Classification Search
CPC .............. H04L 65/105; H04L 65/1069; H04L 65/1083; H04L 69/08; H04L 69/165
USPC .......................................... 709/246, 238, 231
See application file for complete search history.

(56) References Cited

U.S. PATENT DOCUMENTS

| | | | |
|---|---|---|---|
| 7,161,947 B1 * | 1/2007 | Desai ............................ | 370/401 |
| 7,301,913 B2 * | 11/2007 | Corrao et al. ................ | 370/260 |
| 7,324,459 B2 * | 1/2008 | Rasanen et al. ............... | 370/252 |
| 7,392,323 B2 * | 6/2008 | Yim et al. ...................... | 709/236 |
| 7,430,757 B1 * | 9/2008 | Chari et al. ........................ | 726/4 |
| 7,522,594 B2 * | 4/2009 | Piche et al. .................... | 370/389 |
| 7,627,681 B2 * | 12/2009 | Nog et al. ...................... | 709/228 |
| 2002/0199114 A1 * | 12/2002 | Schwartz ....................... | 713/201 |
| 2003/0112823 A1 * | 6/2003 | Collins et al. ................. | 370/474 |
| 2003/0140142 A1 * | 7/2003 | Marples et al. ............... | 709/225 |
| 2003/0188001 A1 * | 10/2003 | Eisenberg et al. ............ | 709/229 |
| 2004/0028035 A1 * | 2/2004 | Read .............................. | 370/352 |
| 2004/0128554 A1 * | 7/2004 | Maher et al. .................. | 713/201 |
| 2004/0244010 A1 * | 12/2004 | Kleyman et al. .............. | 719/318 |
| 2005/0108411 A1 * | 5/2005 | Kliland et al. ................ | 709/230 |
| 2005/0125532 A1 * | 6/2005 | Kimchi ......................... | 709/225 |

* cited by examiner

*Primary Examiner* — Aaron Strange
(74) *Attorney, Agent, or Firm* — Shumaker & Sieffert, P.A.

(57) ABSTRACT

Techniques allow an intermediate (IM) device to transparently intercept and dynamically modify signaling messages being exchanged by a client and a server when negotiating setup and delivery of a multimedia stream from a streaming server. The techniques also allow an IM device to dynamically convert the real-time multimedia stream from a first transport layer protocol to a second transport layer protocol, and the reverse, based on the particular topology of the network including the presence and location of any security devices that may block the multimedia stream. The IM device may be configured to dynamically modify messages intercepted between the client and the server to change a transport layer protocol indicated by the messages from the Transmission Control Protocol (TCP) to the User Datagram Protocol (UDP), and the reverse, and convert a UDP data stream to TCP packets and inject the TCP packets into an established TCP session.

23 Claims, 7 Drawing Sheets

MEDIA STREAM TRANSPORT CONVERSION WITHIN AN INTERMEDIATE NETWORK DEVICE

TECHNICAL FIELD

The invention relates to data transmission in computer networks and, more specifically, delivery of data streams within the computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A client may request delivery of multimedia content over a network from a source using the Real-Time Streaming Protocol (RTSP). In this case, the client establishes a Transmission Control Protocol (TCP) connection to the source, typically using port 554, and requests the multimedia stream using RTSP. RTSP allows a number of options for transport layer protocols over which the actual audio/video streams may be sent. For example, the stream can be sent using Real-Time Control Protocol (RTCP)/Real-Time Transport layer protocol (RTP) over User Datagram Protocol (UDP). As another example, the stream can be interleaved over the established TCP connection. Another option is to deliver the data stream inside Hyper Text Transfer Protocol (HTTP) frame formats, since a firewall will typically allow HTTP traffic to pass through. RTCP/RTP over UDP may be preferred, since UDP is faster and less taxing on the streaming server than TCP. Moreover, UDP packets are smaller than TCP packets since UDP includes fewer reliability and congestion controls. UDP utilizes arbitrary port assignments for sending and receiving data.

However, due to its use of arbitrary ports, using UDP may present a problem in networks having firewalls, gateways, filters, intrusion detection devices or other security devices. In many cases, network administrators typically prefer to use a fixed set of ports through which traffic may enter and exit the network. As a result, a client may initially request that the data stream be delivered via UDP. Often the request times out or otherwise fails due to the intervening security devices. As a result, the client may issue another request for the data stream but request the data stream be delivered using TCP instead of UDP. Making multiple attempts to receive the multimedia content using different transport layer protocols is inefficient. Moreover, using TCP or HTTP for delivering multimedia content may introduce considerable latency and overhead into the network.

SUMMARY

In general, the invention relates to techniques for providing improved transmission of data streams (e.g., multimedia content or other data streams) over a network, such as the Internet or a service provider network. In particular, the techniques allow an intermediate (IM) device to transparently intercept and dynamically modify signaling messages being exchanged by a client and a server when negotiating setup and delivery of a multimedia stream from a streaming server. The techniques also allow an IM device to dynamically convert the real-time multimedia stream from a first transport layer protocol to a second transport layer protocol, and the reverse, based on the particular topology of the network including the presence and location of any security devices that may block the multimedia stream.

For example, the client and the streaming server may use Real-Time Streaming Protocol (RTSP) messages to negotiate the transport parameters to be used for transporting streaming multimedia. An IM device is configured to transparently intercept and dynamically modify the RTSP messages to change the transport parameters. For example, an IM device may change a transport layer protocol indicated by the RTSP messages, such as from a first transport layer protocol that uses a fixed port assignment to a second transport layer protocol that uses an arbitrary port assignment, and the reverse. The IM device also converts the real-time multimedia stream from the first transport layer protocol to the second transport layer protocol, and the reverse. For example, the first transport layer may be the Transmission Control Protocol (TCP) and the second transport layer may be the User Datagram Protocol (UDP).

In this manner, multimedia content may be sent through a firewall using TCP, but converted by the IM device to UDP format for transmission over a portion of the path from the server to the source. IM device 14 transparently accepts the multimedia communications between client 20 and streaming server 16, such that IM device 14 may be seamlessly added to SP network 12 without requiring configuration of the firewall. The techniques described herein may reduce the latency and overhead of a system by allowing multimedia streams to be transmitted using UDP over at least a portion of the system, even when a service provider network includes a firewall.

In one embodiment, a method comprises intercepting, with an intermediate device, signaling messages exchanged between a client device and a streaming server when negotiating delivery of a data stream from the streaming server to the client device. The method also includes dynamically modifying at least one transport parameter in the signaling messages to change a transport layer protocol indicated by the signaling messages between a first transport layer protocol and a second transport layer protocol, wherein the first transport layer protocol uses a fixed port assignment and the second transport layer protocol uses an arbitrary port assignment. The method further comprises intercepting the data stream sent from the streaming server to the client device and converting the data stream between the first transport layer protocol and the second transport layer protocol.

In one embodiment, a system comprises a streaming server, a client device that requests a data stream from the streaming server, and an intermediate device located between the streaming server and the client device. The intermediate device intercepts signaling messages exchanged between the client device and the streaming server when negotiating delivery of the data stream from the streaming server to the client device, dynamically modifies at least one transport parameter in the signaling messages to change a transport layer protocol indicated by the signaling messages between a first transport layer protocol and a second transport layer protocol, and converts the multimedia content between a first transport layer protocol and a second transport layer protocol. The first transport layer protocol uses a fixed port assignment and the second transport layer protocol uses an arbitrary port assignment.

In another embodiment, a network device located between a streaming server and a client device comprises an intercept module to intercept signaling messages exchanged between the client device and the streaming server when negotiating delivery of a data stream from the streaming server to the client device and dynamically modify at least one transport parameter in the signaling messages to change a transport layer protocol indicated by the signaling messages between a first transport layer protocol and a second transport layer protocol. The first transport layer protocol uses a fixed port assignment and the second transport layer protocol uses an arbitrary port assignment. The network device further comprises a conversion module to convert the data stream between the first transport layer protocol and the second transport layer protocol.

In another embodiment, a computer-readable medium contains instructions. The instructions cause a programmable processor to intercept, with an intermediate device, signaling messages exchanged between a client device and a streaming server when negotiating delivery of a data stream from a streaming server to a client device. The instructions further cause the programmable processor to dynamically modify at least one transport parameter in the signaling messages to change a transport layer protocol indicated by the signaling messages between a first transport layer protocol and a second transport layer protocol, wherein the first transport layer protocol uses a fixed port assignment and the second transport layer protocol uses an arbitrary port assignment. The instructions further cause the programmable processor to intercept the data stream sent from the streaming server to the client device, and convert the data stream between the first transport layer protocol and the second transport layer protocol.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
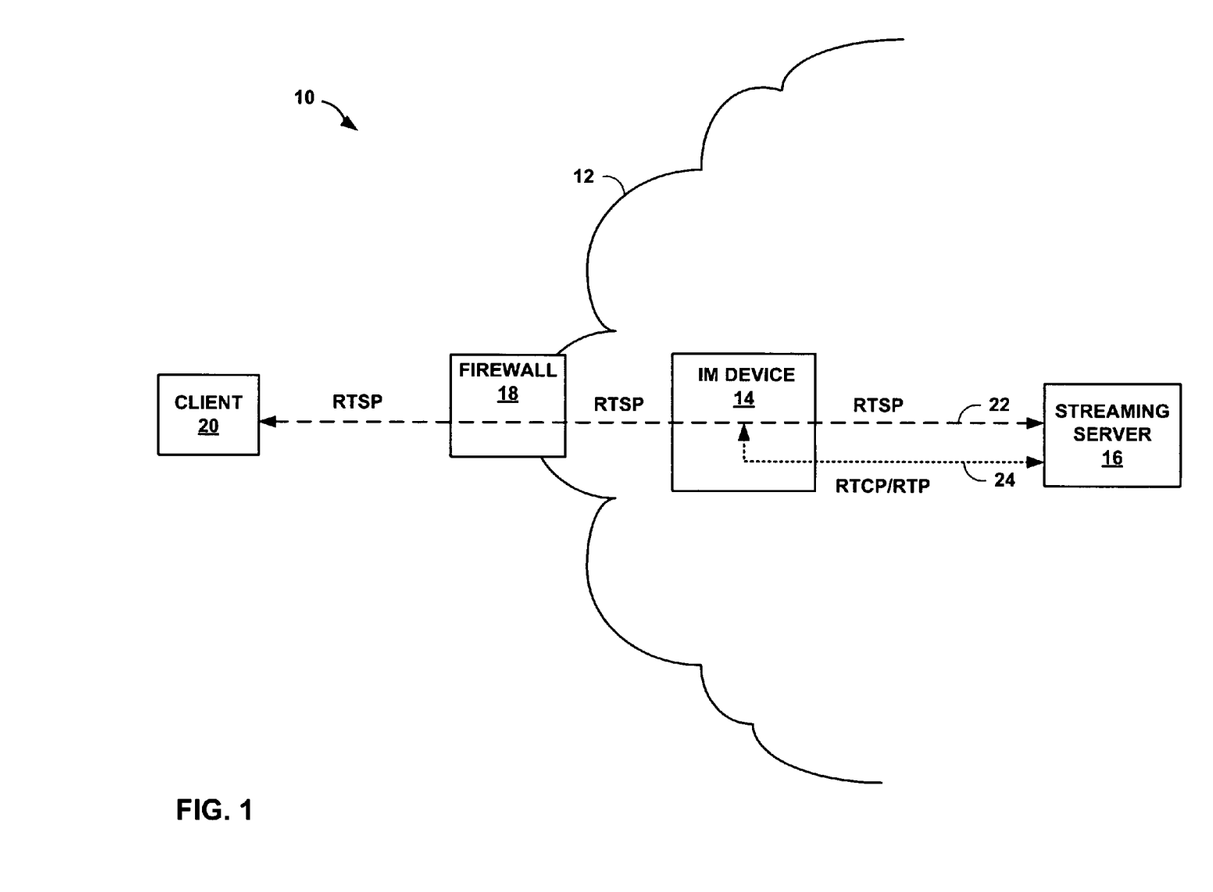
FIG. 1 is a block diagram illustrating an exemplary system in which an intermediate (IM) device is located between a streaming server and a firewall of a service provider (SP) network.

FIG. 1 is a block diagram illustrating an exemplary system 10 in which an intermediate (IM) device 14 is located behind a firewall 18, i.e., between a streaming server 16 and firewall 18 of a service provider (SP) network 12. In the illustrated embodiment, IM device 14 facilitates transmission of multimedia content between streaming server 16 and client 20. Streaming server 16 may provide client 20 with multimedia content, such as Internet Protocol Television (IPTV), desktop conferences, corporate broadcasts, music, video web casts, or other forms of multimedia content.

Client 20 may reside within a remote customer network (not shown), such as a local area network (LAN) of an enterprise or a home office. Client 20 may be a desktop computer, laptop, workstation, PDA, wireless device, network-ready appliance, file server, print server or other network-enabled device. Although shown for purposes of illustration with a single client 20, system 10 may include a plurality of clients of different types that receive a plurality of multimedia streams from streaming server 16. IM device 14 may be a network accelerator, proxy server, load balancer, router, gateway, intelligent switch, intelligent hub, or other type of intermediate network device. Moreover, firewall 18 may be any type of security device, such as a firewall, gateway, packet filter, intrusion detection device or other security device.

Initially, client 20 establishes a signaling session 22 between client 20 and streaming server 16. For example, signaling session 22 may be a Transmission Control Protocol (TCP) connection between client 20 and streaming server 16 on TCP port 554, established using a three-way handshake exchange. Using signaling session 22, client 20 may communicate with streaming server 16 via a signaling protocol, such as the Real-Time Streaming Protocol (RTSP), to negotiate transport parameters for the delivery of a stream of multimedia content from streaming server 16 to client 20.

During the negotiation process, client 20 specifies a transport layer protocol to use for the multimedia delivery. For example, client 20 may use RTSP to request that streaming server 16 utilize the Real-Time Transport layer protocol (RTP) to deliver the multimedia stream via the User Datagram Protocol (UDP) transport layer protocol. However, an intermediate security device, such as firewall 18, may be configured with certain ports open. As a result, firewall 18 may block UDP packets due to the arbitrary port assignments used by UDP. Thus, in the example of FIG. 1, it may not be possible to use UDP for end-to-end delivery of the RTP multimedia stream from streaming server 16 to client 20. However, the RTP multimedia stream may be sent through firewall 18 using a different transport layer protocol, such as the TCP transport layer protocol, that uses fixed port assignments. Techniques are described for using IM device 14 such that the RTP multimedia stream 24 may be delivered using UDP between streaming server 16 and IM device 14, and may be dynamically converted to TCP format and injected into the established signaling session 22 by IM device 14 for communication to client 20 through firewall 18.

To set up delivery of streaming multimedia, client 20 sends RTSP setup messages to streaming server 16. The RTSP setup messages may contain transport parameters, e.g., the version of RTSP supported by the client, the transport layer protocol to be used for the RTP data stream, and any associated UDP or TCP port information. Typically, streaming server 16 will send confirmation messages to client 20 confirming the transport parameters. In this manner, client 20 and streaming server 16 negotiate the transport parameters to be used for transporting the streaming multimedia. During this process, IM device 14 may be configured to transparently intercept and dynamically modify the RTSP setup messages and RTSP confirmation messages based the location of any security device.

In the example of FIG. 1, since there are no security devices located between IM device 14 and streaming server 16, IM device 14 may be configured to dynamically change the transport layer protocol indicated by the setup message sent by client 20 from TCP to UDP. IM device 14 may also change the transport layer protocol indicated by the confirmation message from UDP to TCP. As a result, client 20 receives the data stream using the TCP signaling session, and streaming server 16 sends the data stream using UDP, thereby increasing network efficiency within SP network 12. When IM device 14 receives the RTP multimedia stream 24 via UDP, IM device 14 then converts the multimedia data from UDP packets to TCP packets, and forwards the converted stream on to client 20 via signaling session 22.

IM device 14 facilitates transmission of the multimedia stream in such a manner that streaming server 16 is unaware of the presence of firewall 18. As a result, streaming server 16 will send the multimedia stream using UDP even though the stream would not otherwise pass through firewall 18 in this form. IM device 14 transparently accepts the multimedia communications between client 20 and streaming server 16, such that IM device 14 may be seamlessly added to SP network 12 without requiring reconfiguration of firewall 18 or streaming server 16. The techniques described herein may reduce the latency and overhead of system 10 by allowing multimedia streams to be transmitted using UDP over at least a portion of system 10, even when SP network 12 includes firewall 18. Although described in reference to multimedia streams by way of example, the techniques may be applied for delivery of any type of data stream.

Figure 2:
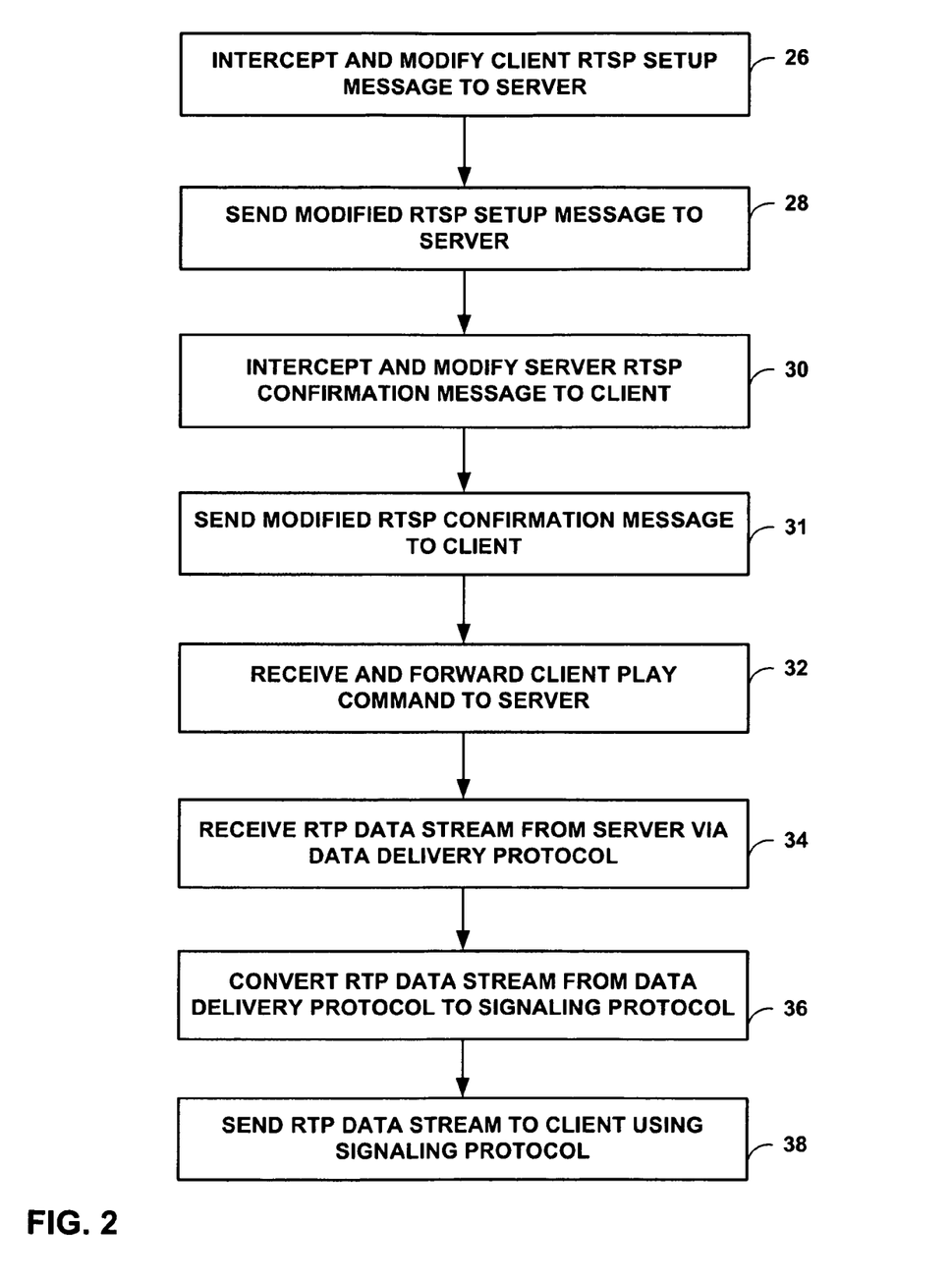
FIG. 2 is a flowchart illustrating example operation of the IM device of FIG. 1 in accordance with the principles of the invention.

FIG. 2 is a flowchart illustrating example operation of IM device 14 of FIG. 1 in accordance with the principles of the invention. Initially, client 20 may establish a TCP connection to streaming server 16 on TCP port 554. Client 20 may then proceed to exchange RTSP messages with streaming server 16 to negotiate transport parameters for transporting multimedia content. IM device 14 transparently intercepts the RTSP setup messages sent from client 20 to streaming server 16 (26).

For example, an intercepted RTSP request may identify to server 16 the transport mechanisms that client 20 would like to use, in order of preference, and the ports that client 20 wants to use for the data transport. In general, client 20 may request to use a data delivery protocol such as UDP as the transport layer protocol for the RTP data stream. As another example, client 20 may request to use a signaling protocol such as TCP as the transport layer protocol for the RTP data stream. Client 20 may also specify a range of ports that client 20 has available for receiving the RTP data stream and for sending RTCP control messages.

IM device 14 may dynamically modify the intercepted RTSP setup message (26). For example, in the event the intercepted RTSP setup message specifies TCP as the requested transport layer protocol, IM device 14 will modify the RTSP setup message to specify UDP instead, and send the modified RTSP setup message to streaming server 16 (28). In contrast, when the intercepted RTSP setup message specifies UDP as the requested transport layer protocol, IM device 14 may pass the message through to streaming server 16 without modification. In either case, streaming server 16 receives a RTSP setup message requesting that the multimedia stream be sent using UDP as the transport layer protocol. Streaming server 16 sends RTSP confirmation messages to client 20 to confirm the transport parameters requested by client 20, i.e., confirming that UDP will be the transport layer protocol. In this manner, IM device 14 seamlessly directs streaming server 16 to deliver the multimedia content via the RTP multimedia stream 24 using UDP.

During the negotiation process, IM device 14 may also transparently intercept an RTSP confirmation message sent from streaming server 16 to client device 20 (30). In this example, the RTSP confirmation message may confirm that UDP will be used to transport the RTP data stream. The RTSP confirmation message may also indicate a range of ports that streaming server 16 has available for sending the RTP data stream and for receiving RTCP control messages. IM device 14 may modify the intercepted RTSP confirmation message to change the data transport from UDP to TCP and specify the well-known port associated with RTSP for data delivery (30). IM device 14 sends the modified RTSP confirmation message to client 20 (31). As a result of this modified negotiation of transport parameters, streaming server 16 has agreed to send the RTP data stream using UDP, client 20 has agreed to receive the RTP data stream using TCP, and IM device 14 will transparently convert the data stream from UDP format to TCP format before forwarding the data through firewall 18. IM device 14 thereby conceals the existence of firewall 18 from streaming server 16, so that streaming server 16 may function as though firewall 18 were not present by sending the multimedia stream using UDP.

Next, IM device 14 receives a PLAY command from client 20 that instructs streaming server 16 to commence delivery of the RTP data stream, and IM device 14 forwards the PLAY command to streaming server 16 (32). Streaming server 16 receives the PLAY command and begins sending the multimedia as an RTP data stream. IM device 14 receives the RTP data stream from streaming server 16 via UDP (34), i.e., over data stream 24. IM device 14 converts the multimedia content from the data delivery protocol to the signaling protocol, e.g., from UDP to TCP (36). For example, IM device 14 may convert packets in the multimedia stream from UDP packets to TCP packets by stripping off the UDP headers, buffering the content, and forming TCP/IP packets according to stored session information for signaling session 22. For example, IM device 14 adds a header that includes the source port, destination port, a sequence number, an acknowledgement number, and other TCP/IP packet header information. IM device 14 then injects the converted packets into the open signaling session 22, e.g., a TCP connection, to send the RTP data stream to client 20 (38).

Figure 3:
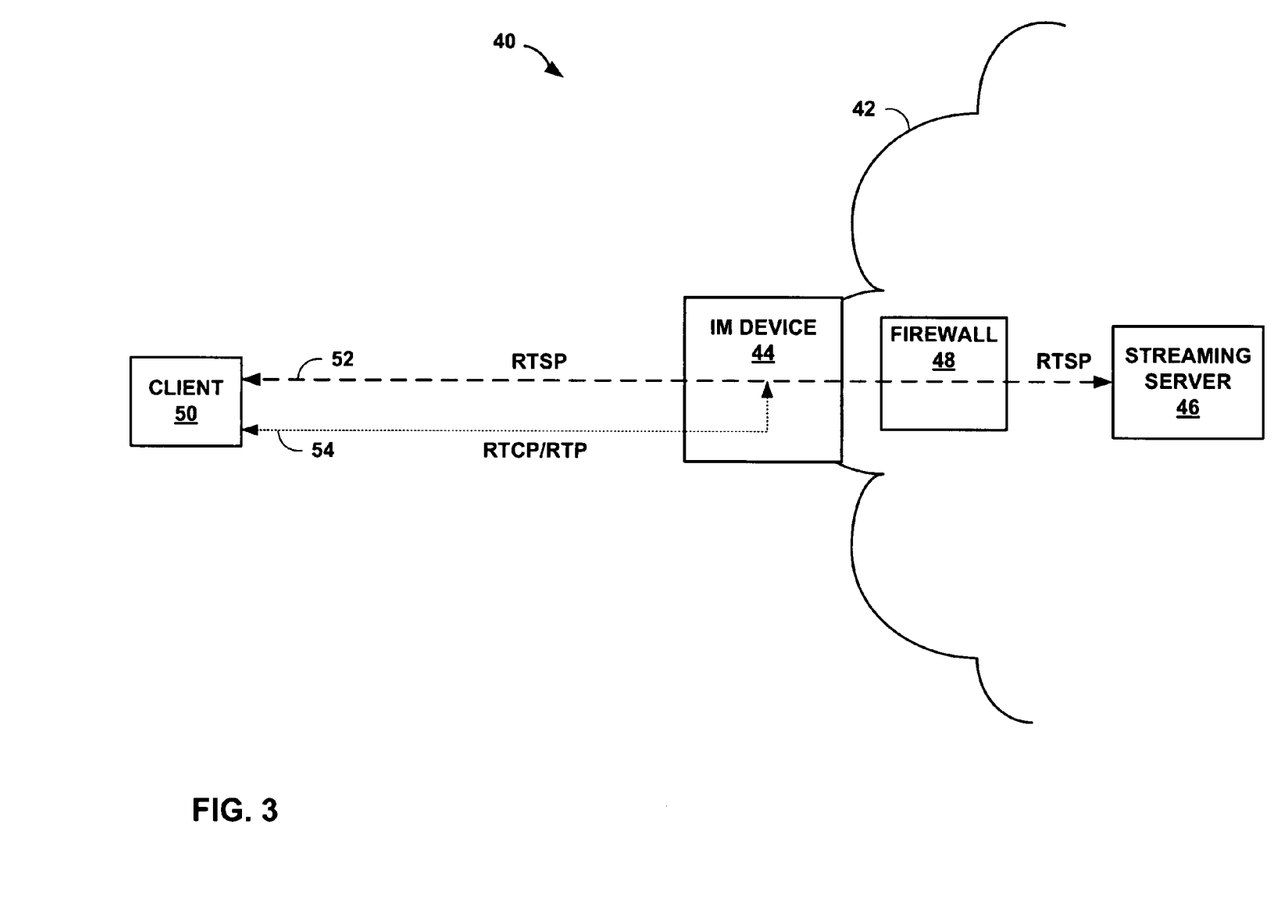
FIG. 3 is a block diagram illustrating another exemplary system in which an IM device is located between a firewall of an SP network and a client.

FIG. 3 is a block diagram illustrating another exemplary system 40 having an SP network 42 in which an IM device 44 is located in front of a firewall 48 of SP network 42, i.e., firewall 48 is between IM device 44 and streaming server 46. In a manner similar to the process described above, IM device 44 facilitates transmission of multimedia content between streaming server 46 and client 50 by modifying the negotiation messages exchanged by client 50 and streaming server 46 to set up the multimedia stream.

Client 50 establishes a signaling session 52 between client 50 and streaming server 46. For example, signaling session 52 may be a TCP connection between client 50 and streaming server 46 on TCP port 554, established using a three-way handshake exchange. Client 50 then uses RTSP to negotiate transport parameters for the delivery of a stream of multimedia content from streaming server 46 to client 50. Streaming server 46 uses RTP to deliver the multimedia stream, and client 50 may use RTCP to communicate control flow messages and information about the quality of data delivery to streaming server 46.

During the negotiation process, client 50 specifies a transport layer protocol that client 50 wants to use for the multimedia delivery. For example, client 50 sends RTSP setup messages to streaming server 46. The RTSP setup messages may contain transport parameters, such as the version of RTSP supported by client 50, the transport layer protocol to be used for the RTP data stream, and any associated UDP or TCP port information. Streaming server 46 sends confirmation messages to client 50 confirming the transport parameters. In this manner, client 50 and streaming server 46 negotiate the transport parameters to be used for transporting the streaming multimedia.

As described above, IM device 44 may transparently intercept and dynamically modify the RTSP setup messages and RTSP confirmation messages. However, in this example, if client 50 requests UDP as the transport layer protocol, IM device 44 is configured to change the requested transport layer protocol from UDP to TCP. IM device 44 may also change the transport layer protocol indicated by the confirmation message from TCP to UDP. This way, client 50 receives RTP data stream using UDP, and streaming server 46 outputs RTP data stream using signaling session 52. When IM device 44 receives the RTP multimedia stream interleaved over signaling session 52, e.g., a TCP session, IM device 44 extracts the multimedia content, converts the data from TCP packets to UDP packets, and forwards the converted data stream 54 to client 50.

IM device 44 facilitates transmission of the multimedia stream in such a manner that client 50 is unaware of the presence of firewall 48. As a result, streaming server 46 sends the multimedia stream using TCP which easily passes through firewall 48 via a well-known port, and IM device 44 dynamically converts the stream to UDP for transmission to client 50. IM device 44 transparently modifies the multimedia communications between client 50 and streaming server 46, such that IM, device 44 may be seamlessly added to SP network 42 without requiring configuration of firewall 48 or streaming server 46. The techniques described herein may reduce the latency and overhead of system 40 by allowing multimedia streams to be transmitted using UDP over at least a portion of system 40, even when SP network 42 includes firewall 48.

Figure 4:
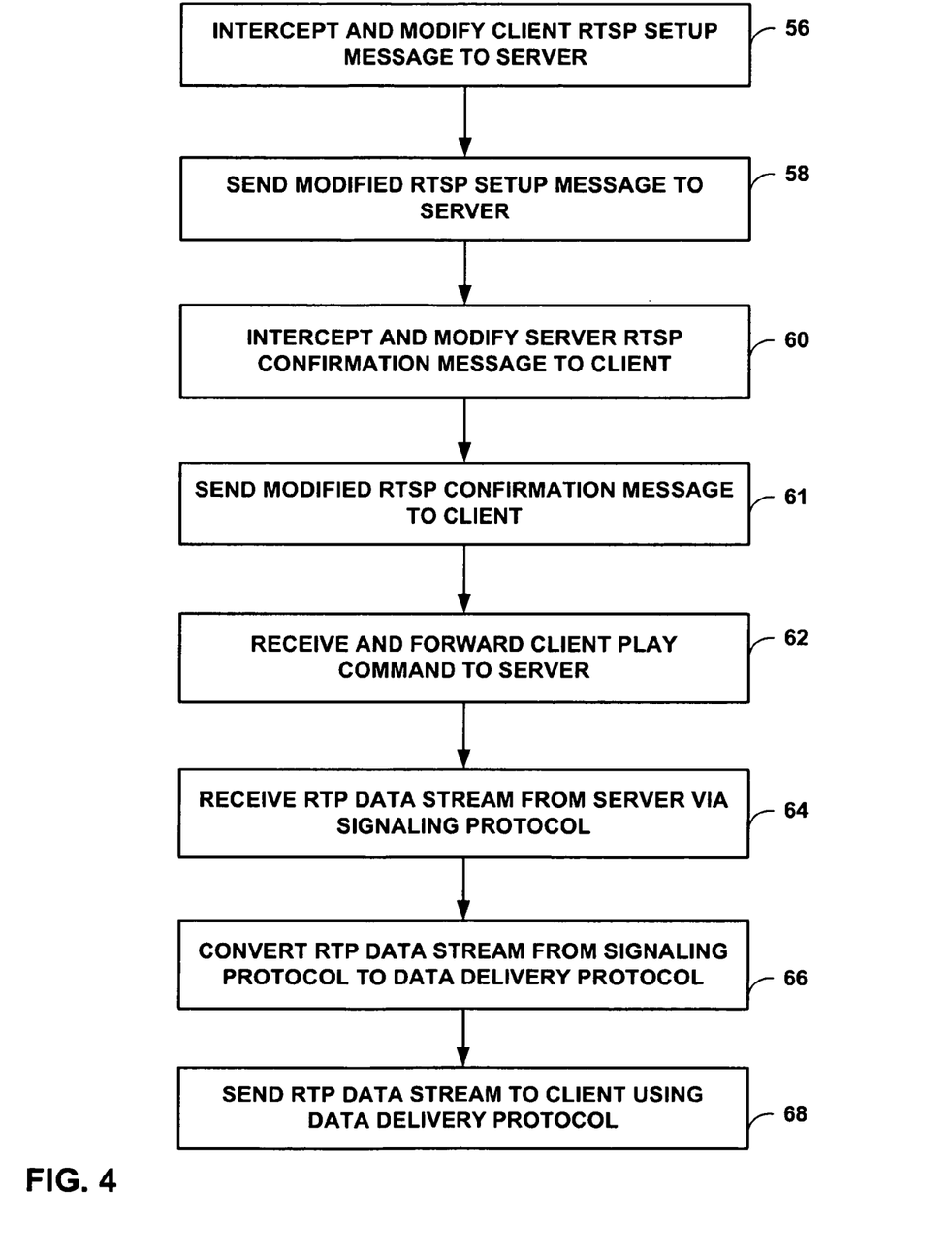
FIG. 4 is a flowchart illustrating example operation of the IM device of FIG. 3 in accordance with the principles of the invention.

FIG. 4 is a flowchart illustrating example operation of IM device 44 of FIG. 3 in accordance with the principles of the invention. Initially, client 50 may establish a TCP connection to streaming server 46 on TCP port 554. Client 50 may then proceed to exchange RTSP messages with streaming server 46 to negotiate transport parameters for transporting multimedia content. IM device 44 transparently intercepts an RTSP setup message sent from client 50 to streaming server 46 (56). The RTSP request may identify to the server the transport mechanisms the client would like to use, in order of preference, and the ports that client 50 wants to use for the data transport. For example, client 50 may request to use a data delivery protocol such as UDP as the transport layer protocol for the RTP data stream. As another example, client 50 may request to use a signaling protocol such as TCP as the transport layer protocol for the RTP data stream. Client 50 may specify a range of ports that client 50 has available for receiving the RTP data stream and for sending RTCP control messages.

IM device 44 may dynamically modify the intercepted RTSP setup message (56). In particular, when the intercepted RTSP setup message specifies UDP as the requested transport layer protocol, IM device 44 will modify the RTSP setup message to specify TCP instead, and send the modified RTSP setup message to streaming server 46 (58). In contrast, when the intercepted RTSP setup message specifies TCP as the requested transport layer protocol, IM device 44 may pass the message through to streaming server 46 without modifying the message. Streaming server 46 receives the modified RTSP setup message indicating that the multimedia stream will be sent using TCP as the transport layer protocol. Streaming server 46 sends RTSP confirmation messages to client 50 to confirm the transport parameters requested by client 50, i.e., confirming that TCP will be the transport layer protocol.

IM device 44 may transparently intercept the RTSP confirmation messages sent from streaming server 46 to client device 50 (60). The RTSP confirmation message may indicate that TCP will be used to transport the RTP data stream. The RTSP confirmation message may also indicate a range of ports that streaming server 46 has available for sending the RTP data stream and for receiving RTCP control messages. IM device 44 may modify the intercepted RTSP confirmation message to change the data transport from TCP to UDP (60). IM device 44 sends the modified RTSP confirmation message to client 50 (61). As a result of this modified negotiation of transport parameters, streaming server 46 has agreed to send the RTP data stream using TCP, client 50 has agreed to receive the RTP data stream using UDP, and IM device 44 will transparently convert the data stream from TCP format to UDP format after receiving the data through firewall 48. IM device 44 thereby conceals the existence of firewall 48 from client 50, so that client 50 may function as though firewall 48 were not present, by receiving the multimedia stream using UDP.

IM device 44 receives a PLAY command from client 50 that instructs streaming server 46 to commence delivery of the RTP data stream, and IM device 44 forwards the PLAY command to streaming server 46 (62). IM device 44 receives the RTP data stream from streaming server 46 via TCP (64), i.e., over signaling session 52. IM device 44 extracts the RTP data from signaling session 52 and converts the multimedia content from the signaling protocol to the data delivery protocol, e.g., from TCP to UDP (66). In particular, IM device 44 may convert packets in the multimedia stream from TCP packets to UDP packets by stripping off the TCP headers, buffering the content, and forming UDP/IP packets according to stored session information for signaling session 52. For example, IM device 44 adds a header that includes the source port, destination port, and other UDP/IP packet header information. IM device 44 then injects the converted packets into data stream 54 to send the RTP data stream to client 50 (68).

Figure 5:
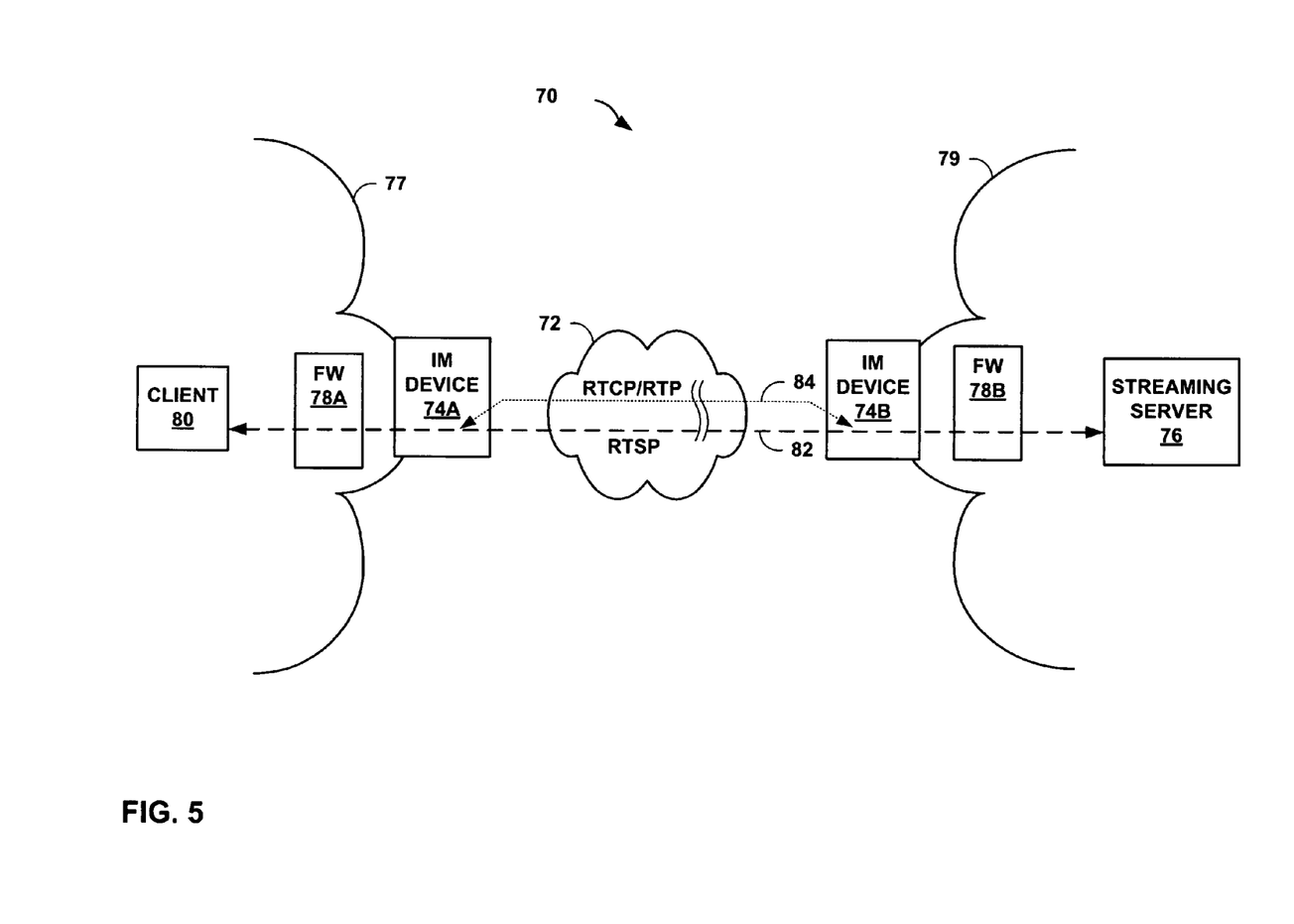
FIG. 5 is a block diagram illustrating another exemplary system having two IM devices located outside of firewalls of customer network and SP network, respectively.

FIG. 5 is a block diagram illustrating another exemplary system 70 having two IM devices 74A and 74B ("IM devices 74") outside of firewalls ("FW") 78A and 78B ("firewalls 78") of customer network 77 and SP network 79, respectively. IM devices 74 are separated by wide area network (WAN) 72. Client 80 of customer network 77 may request and receive multimedia content from streaming server 76 of SP network 79. Customer network 77, e.g., a LAN or a WAN, may be geographically remote with respect to SP network 79. Although shown for purposes of illustration having a single client 80, system 70 may include a plurality of clients of different types that receive a plurality of multimedia streams from streaming server 76.

Client 80 establishes a signaling session 82 between client 80 and streaming server 76. For example, signaling session 82 may be a TCP connection between client 80 and streaming server 76 on TCP port 554, established using a three-way handshake exchange. Client 80 then uses RTSP to negotiate transport parameters for the delivery of a stream of multimedia content from streaming server 76 to client 80. Streaming server 76 uses RTP to deliver the multimedia stream, and client 80 may use RTCP to communicate control flow messages and information about the quality of data delivery to streaming server 76.

During the negotiation process, client 80 specifies a transport layer protocol that client 80 wants to use for the multimedia delivery. For example, client 80 sends RTSP setup messages to streaming server 76 specifying certain transport parameters, such as the version of RTSP supported by client 80, the transport layer protocol to be used for the RTP data stream, and any associated UDP or TCP port information. In response, streaming server 76 sends confirmation messages to client 80 confirming the transport parameters. In this manner, client 80 and streaming server 76 negotiate the transport parameters to be used for transporting the streaming multimedia.

IM devices 74 may operate independently (or optionally in a cooperative manner) to transparently intercept and dynamically modify the RTSP setup messages and RTSP confirmation messages. Each of IM devices 74A and 74B may be unaware of the presence of the other. For example, assuming client 80 sends an RTSP setup message requesting TCP as the transport layer protocol, IM device 74A may dynamically modify the message by changing the requested transport layer protocol from TCP to UDP, and forward the modified message towards streaming server 76. IM device 74B may similarly intercept the modified RTSP setup message, change the transport layer protocol from UDP to TCP, and forward the modified message towards streaming server 76. IM devices 74 may also change the transport layer protocol indicated by the confirmation message sent from streaming server 76 to client 80.

This way, both client 80 and streaming server 76 believe the RTP data stream will be sent interleaved over signaling session 82, e.g., a TCP session. However, after the RTP multimedia stream has passed through firewall 78B, IM device 74B receives the RTP multimedia stream via TCP and transparently converts the multimedia data from TCP packets to UDP packets. In this manner, the multimedia stream is transmitted on data stream 84 across WAN 72 using UDP. IM device 74A intercepts the multimedia stream on the other side of WAN 72, converts the stream from UDP packets to TCP packets, and injects the data stream onto open signaling session 82 to be transmitted through firewall 78A to client 80.

IM devices 74 facilitate transmission of the multimedia stream in such a manner that client 80 and streaming server 76 are unaware of the presence of firewalls 78A and 78B, respectively. As a result, streaming server 76 will send the multimedia stream using TCP to go through firewall 78B, and IM device 74B converts the stream to UDP for transmission across WAN 72, and streaming server 76A converts the stream back to TCP to go through firewall 78A to client 80. IM devices 74 transparently accepts the multimedia communications between client 80 and streaming server 76, such that IM devices 74 may be seamlessly added to customer network 77 and SP network 79 without requiring configuration of firewalls 78. In this manner, IM devices 74 may improve the speed of transmission of the multimedia content by using UDP across WAN 72 between streaming server 76 to client 80. Using UDP in this manner may also reduce latency and overhead in system 70.

Figure 6:
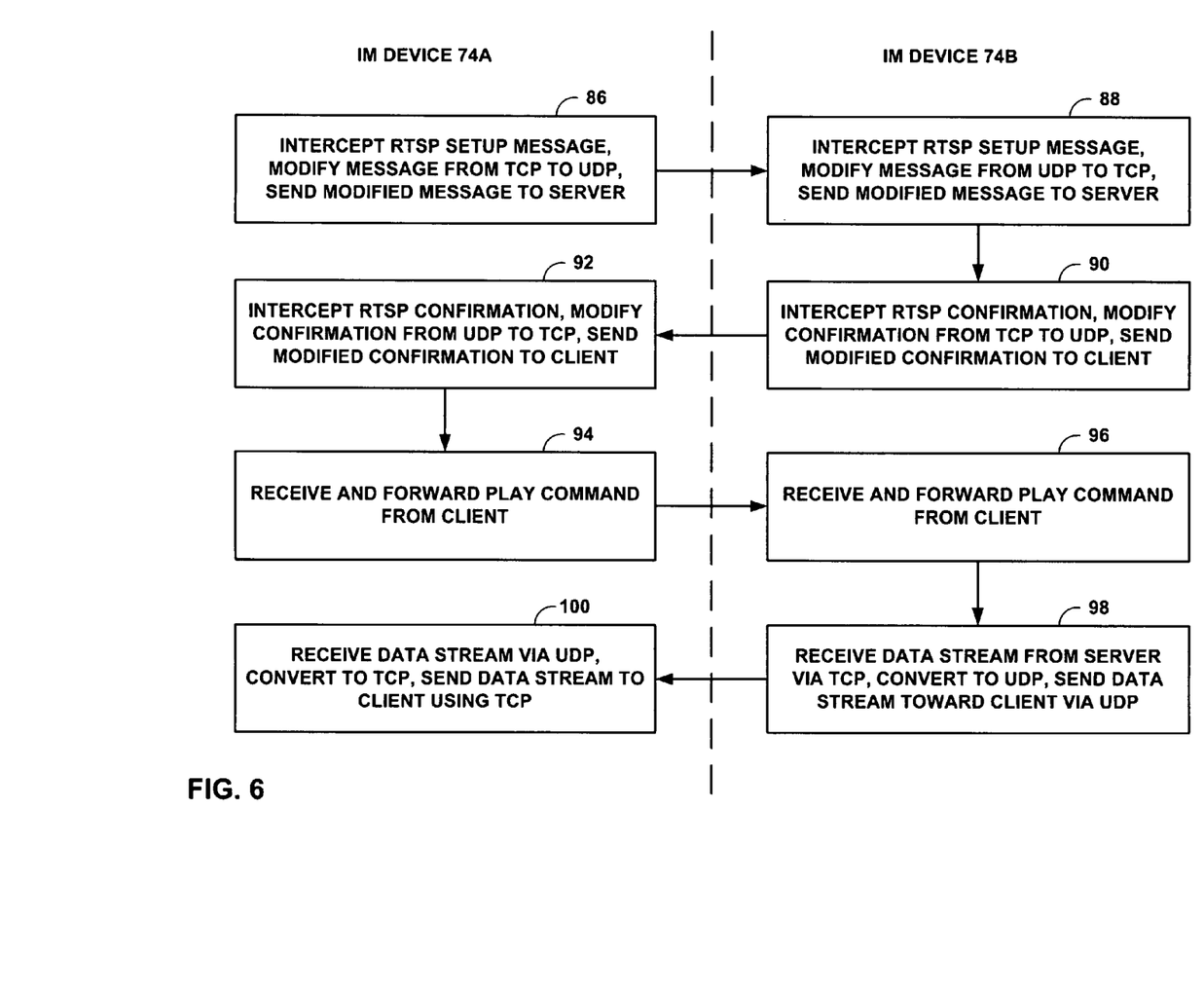
FIG. 6 is a flowchart illustrating example operation of the IM devices of FIG. 5 in accordance with the principles of the invention.

FIG. 6 is a flowchart illustrating example operation of IM devices 74 of FIG. 5 in accordance with the principles of the invention. Initially, client 80 may establish signaling session 82, e.g., a TCP connection, to streaming server 76 on TCP port 554. Client 80 may then proceed to exchange RTSP messages with streaming server 76 to negotiate transport parameters for transporting multimedia content.

Client 80 may send an RTSP setup message for a multimedia stream to streaming server 76 that indicates desired transport parameters, such as a transport layer protocol and a list of available ports. IM device 74A transparently intercepts the RSTP setup message sent from client 80 to streaming server 76, and dynamically modifies the requested transport (86). For example, when client 80 requests that streaming server 76 send the multimedia stream using TCP, IM device 74A modifies the request to specify UDP as the requested transport. As another example, when client 80 requests that streaming server 76 send the multimedia stream using UDP, IM device 74A may pass on the request without modification. In this manner, IM device 74A modifies the setup of the multimedia stream such that the stream will be delivered over WAN 72 using UDP. IM device 74A transmits the request toward streaming server 76 (86).

IM device 74B may also transparently intercept the modified RTSP setup request, and dynamically modify the requested transport. Since firewall 78B may block UDP packets, IM device 74B is configured to modify the requested transport from UDP to TCP. IM device 74B sends the modified request towards streaming server 76 (88). Streaming server 76 receives the modified RTSP setup message indicating that the multimedia stream will be sent using TCP as the transport layer protocol. Streaming server 76 sends RTSP confirmation messages to client 80 to confirm the transport parameters requested by client 80, i.e., confirming that TCP will be the transport layer protocol.

The RTSP confirmation message sent by streaming server 76 is intercepted by IM device 74B. IM device 74B dynamically modifies the transport layer protocol indicated by the confirmation message from TCP to UDP, and sends the modified confirmation message towards client 80 (90). This confirms that the multimedia stream will be transmitted across WAN 72 using UDP. IM device 74A similarly intercepts the modified RTSP confirmation message, modifies the transport layer protocol from UDP to TCP, and sends the modified confirmation message to client 80 (92). Client 80 receives the confirmation message.

As a result of this modified negotiation of transport parameters, streaming server 76 has agreed to send the RTP data stream using TCP, client 80 has agreed to receive the RTP data stream using TCP, IM device 74B will convert the data stream after it has passed through firewall 78B from TCP format to UDP format and transmit the data across WAN 72 via UDP, and IM device 74A will convert the data stream back to TCP format to be sent through firewall 78A to client 80.

IM device 74A receives a PLAY command from client 80 that instructs streaming server 76 to commence delivery of the RTP data stream, and forwards the PLAY command toward streaming server 76 (94). IM device 74B similarly receives the PLAY command and forwards the PLAY command toward streaming server 76 (96). Streaming server 76 receives the PLAY command and begins to transmit the requested multimedia stream over signaling session 82 using TCP. The multimedia stream passes through firewall 78B, and is intercepted by IM device 74B. IM device 74B converts the multimedia stream from TCP packets to UDP packets, as described above, and sends the converted multimedia over data stream 84 across WAN 72 using UDP (98). IM device 74A receives the multimedia data on data stream 84 using UDP, converts the multimedia stream to TCP packets, and injects the converted multimedia stream onto the open TCP session 82 (100). The multimedia stream passes through firewall 78A to client 80.

Figure 7:
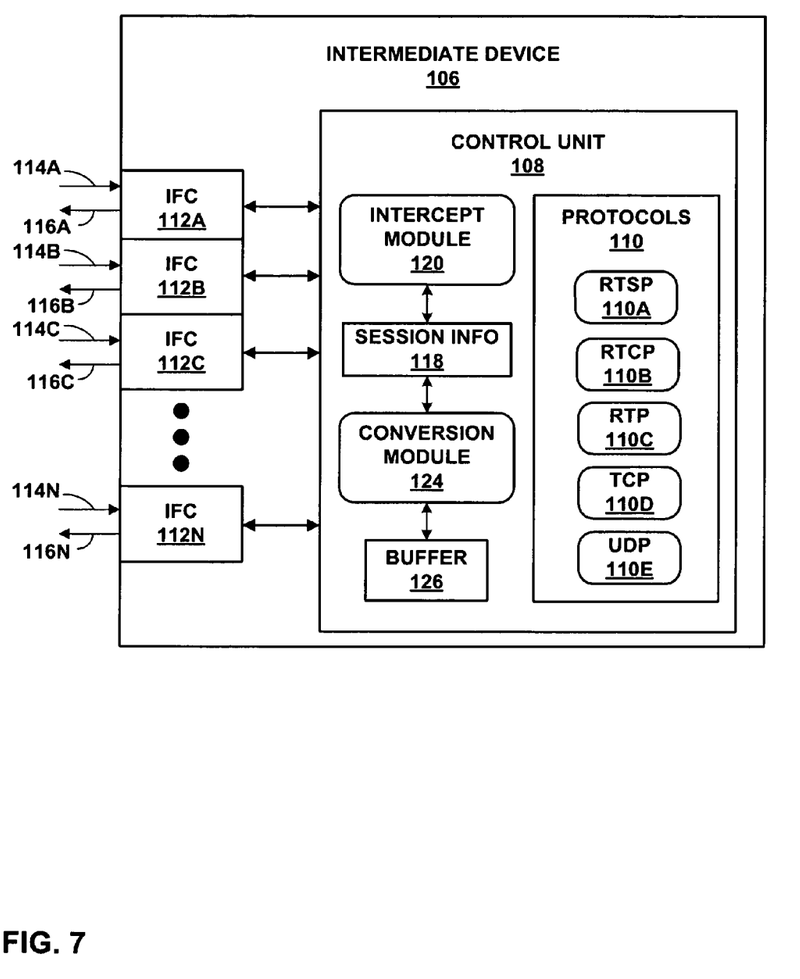
FIG. 7 is a block diagram illustrating an exemplary intermediate device that operates in accordance with the principles of the invention.

FIG. 7 is a block diagram illustrating an exemplary intermediate (IM) device 106. IM device 106 may operate substantially similar to any of IM devices 14, 44, and 74 of FIGS. 1, 3, and 5, respectively. In general, IM device 106 is capable of interacting with network devices to facilitate transmission of multimedia content through a network. In particular, IM device 106 may intercept RTSP messages exchanged by clients and servers negotiating transport parameters for multimedia transmissions, and may dynamically modify the RTSP messages to change the transport layer protocols requested. IM device 106 is also capable of converting a multimedia stream from a signaling protocol format to a data delivery protocol format, and the reverse. IM device 106 may be a network accelerator, proxy server, load balancer, router, gateway, intelligent switch, intelligent hub, or other type of intermediate network device.

In the illustrated embodiment, IM device 106 includes interface cards (IFCs) 112A-112N ("IFCs 112") that receive packets on inbound links 114A-114N ("inbound links 114") and send packets on outbound links 116A-116N ("outbound links 116"). IFCs 112 are coupled to inbound links 114 and outbound links 116 via a number of interface ports (not shown).

IM device 106 also includes control unit 108 that provides an operating environment for protocols 110. In the example of FIG. 7, protocols 110 include RTSP 110A, RTCP 110B, RTP 110C, TCP 110D, and UDP 110E. In other embodiments, other protocols may be executed within control unit 108. IM device 106 may use RTSP protocol 110A to set up multimedia sessions. IM device 106 may also use RTSP protocol 110A as a network "remote control" for streaming servers, i.e., to send PLAY or TEARDOWN commands to start or stop multimedia transmissions. IM device 106 may use RTCP protocol 110B to periodically transmit control messages to participants in a streaming multimedia session. For example, IM device 106 may use RTCP protocol 110B to provide feedback on the quality of service provided. IM device 106 sends and receives TCP packets using TCP protocol 110D, and sends and receives UDP packets using UDP protocol 110E.

Control unit 108 also maintains session information ("SESSION INFO") 118 that includes information related signaling sessions intercepted and monitored by IM device 106. For example, session information 118 may include information about TCP connections established through IM device 106. Control unit 108 may maintain session information 118 in the form of one or more tables, databases, link lists, radix trees, databases, flat files, or any other data structures.

IM device 106 uses intercept module 120 to transparently intercept packets from a network. For example, intercept module 120 may intercept RTSP setup messages and RTSP confirmation messages exchanged by a client device and a server. IM device 106 may examine the intercepted RTSP messages using RTSP protocol 110A. Intercept module 120 may dynamically modify certain transport parameters specified by the RTSP messages, as described above with respect to FIGS. 2, 4, and 6. For example, intercept module may modify the specified transport layer protocol from TCP to UDP or from UDP to TCP, depending on the direction from which the packet was received and the configuration of IM device 106. IM device 106 may also update session information 118 based on data in the RTSP messages.

As another example, IM device 106 may use intercept module 120 to intercept a multimedia stream, and use conversion module 124 to convert packets in the multimedia stream from a signaling protocol format (i.e., TCP) to a data delivery protocol format (i.e., UDP), and the reverse. For example, conversion module 124 may convert UDP packets to TCP packets by stripping off the UDP header, and buffering the contents of the packets in buffer 126. Conversion module 124 then forms TCP segments, adds TCP/IP header information constructed from session information 118, and outputs the TCP/IP packets on one of outbound links 116. Conversion module 124 may perform similar steps in converting a multimedia stream from TCP packets to UDP datagrams and sending the multimedia stream as UDP/IP packets on one of outbound links 116.

Various embodiments of the invention have been described. These and other embodiments are within the scope of the following claims.

The invention claimed is:

1. A method comprising:
    intercepting, with an intermediate device, a signaling message exchanged via a signaling session established between a client device and a streaming server when negotiating delivery of a data stream from the streaming server to the client device, wherein the signaling message comprises a setup message that requests the data stream to be sent using a first transport layer protocol by including a transport parameter that specifies the first transport layer protocol as the transport layer protocol to be subsequently used when delivering the data stream from the streaming server to the client device;
    dynamically modifying the transport parameter in the intercepted setup message to change the transport layer protocol indicated by the setup message between a first transport layer protocol that uses a fixed port assignment and a second transport layer protocol that uses an arbitrary port assignment, so as to specify the second transport layer protocol instead of the first transport layer protocol;
    outputting the intercepted setup message via the signaling session between the client device and the streaming server as a dynamically modified setup message that requests the data stream to be sent using the second transport layer protocol;
    intercepting the data stream sent from the streaming server to the client device; and
    converting the data stream between the first transport layer protocol and the second transport layer protocol.

2. The method of claim 1,
    wherein intercepting the signaling message exchanged on the signaling session comprises intercepting the signaling message from a Transmission Control Protocol (TCP) session between the client device and the streaming server,
    wherein intercepting the data stream comprises intercepting the data stream separate from the TCP session, and
    wherein converting comprises injecting the data stream into the TCP session at the intermediate device.

3. The method of claim 1, wherein the data stream comprises a multimedia data stream carrying multimedia content.

4. The method of claim 1, further comprising:
    configuring the intermediate device to dynamically modify the indicated transport layer protocol of the intercepted setup message from the User Datagram Protocol (UDP) to the Transmission Control Protocol (TCP) when a security device is positioned between the intermediate device and the streaming server.

5. The method of claim 1, further comprising:
    configuring the intermediate device to dynamically modify the indicated transport layer protocol of the intercepted setup message from the Transmission Control Protocol (TCP) to the User Datagram Protocol (UDP) when the intermediate device is positioned between a security device and the streaming server.

6. The method of claim 1, wherein converting the data stream between the first transport layer protocol and the second transport layer protocol comprises converting the data stream between the Transmission Control Protocol (TCP) and the User Datagram Protocol (UDP).

7. The method of claim 6, wherein converting the data stream between TCP and UDP comprises stripping TCP headers from TCP packets, buffering data from the TCP packets, forming UDP datagrams from the buffered data, and applying UDP headers to the UDP datagrams.

8. The method of claim 6, wherein converting the data stream between TCP and UDP comprises stripping UDP headers from UDP packets, buffering data from the UDP packets, forming TCP segments from the buffered data, and applying TCP headers to the TCP segments.

9. The method of claim 1, further comprising forwarding an intercepted message from the intermediate device without modifying the transport parameter.

10. The method of claim 1, wherein the steps of intercepting a message, dynamically modifying at least one transport parameter, intercepting the data stream, and converting the data stream are performed by one of a network accelerator, a proxy server, a load balancer, a router, a gateway, an intelligent switch, and an intelligent hub.

11. The method of claim 1,
wherein intercepting the signaling message comprises intercepting a confirmation message that confirms a data stream will be sent using the second transport layer protocol by including a transport parameter that specifies the second transport layer protocol, and
further comprising dynamically modifying the transport parameter within the confirmation message to specify the first transport layer protocol instead of the second transport layer protocol; and
outputting the intercepted confirmation message as a dynamically modified confirmation message that confirms the data stream will be sent using the first transport layer protocol.

12. A system comprising:
a streaming server;
a client device that requests a data stream from the streaming server; and
an intermediate device located between the streaming server and the client device,
wherein the intermediate device intercepts a signaling message exchanged via a signaling session established between the client device and the streaming server when negotiating delivery of the data stream from the streaming server to the client device, wherein the signaling message comprises a setup message that request the data stream to be sent using a first transport layer protocol by including a transport parameter that specifies the first transport layer protocol as the transport layer protocol to be subsequently used when delivering the data stream from the streaming server to the client device, and dynamically modifies the transport parameter in the intercepted setup message to change the transport layer protocol indicated by the setup message between a first transport layer protocol that uses a fixed port assignment and a second transport layer protocol that uses an arbitrary port assignment, so as to specify the second transport layer protocol instead of the first transport layer protocol, and
wherein the intermediate device outputs the intercepted setup message via the signaling session between the client device and the streaming server as a dynamically modified setup message that requests the data stream to be sent using the second transport layer protocol, and converts the multimedia content between a first transport layer protocol and a second transport layer protocol.

13. The system of claim 12, wherein the first transport layer protocol is the Transmission Control Protocol (TCP) and the second transport layer protocol is the User Datagram Protocol (UDP).

14. The system of claim 12, further comprising:
a security device located between the streaming server and the client device to filter communications between the streaming server and the client device, wherein the intermediate device is configured to dynamically modify the indicated transport layer protocol from the User Datagram Protocol (UDP) to the Transmission Control Protocol (TCP) when the security device is positioned between the intermediate device and the streaming server.

15. The system of claim 12, further comprising:
a security device located between the streaming server and the client device to filter communications between the streaming server and the client device, wherein the intermediate device is configured to dynamically modify the indicated transport layer protocol from the Transmission Control Protocol (TCP) to the User Datagram Protocol (UDP) when intermediate device is positioned between the security device and the streaming server.

16. The system of claim 12, wherein the data stream comprises a multimedia data stream carrying multimedia content.

17. The system of claim 12, wherein the transport layer protocol is one of the Transmission Control Protocol (TCP) and the User Datagram Protocol (UDP).

18. The system of claim 12, wherein the intermediate device injects the converted data stream into an established Transmission Control Protocol (TCP) session.

19. The system of claim 12, wherein the intermediate device is one of a network accelerator, a proxy server, a load balancer, a router, a gateway, an intelligent switch, and an intelligent hub.

20. The system of claim 12, wherein the signaling message exchanged between the client device and the streaming server is a Real-Time Streaming Protocol (RTSP) signaling message.

21. A network device positioned between a streaming server and a client device, comprising:
a control unit;
an intercept module configured to execute within the control unit to intercept a signaling message exchanged via a signaling session established between the client device and the streaming server when negotiating delivery of a data stream from the streaming server to the client device, wherein the signaling message comprises a setup message that request the data stream to be sent using a first transport layer protocol by including a transport parameter that specifies the first transport layer protocol as the transport layer protocol to be subsequently used when delivering the data stream from the streaming server to the client device, and dynamically modify the transport parameter in the intercepted setup message to change the transport layer protocol indicated by the setup message between a first transport layer protocol that uses a fixed port assignment and a second transport layer protocol that uses an arbitrary port assignment, so as to specify the second transport layer protocol instead of the first transport layer protocol,
an interface card to output the intercepted setup message via the signaling session between the client device and the streaming server as a dynamically modified setup message that requests the data stream to be sent using the second transport layer protocol and receive the data stream sent from the streaming server to the client device; and a conversion module to convert the data stream between the first transport layer protocol and the second transport layer protocol.

22. The network device of claim 21, wherein the first transport layer protocol is the Transmission Control Protocol (TCP) and the second transport layer protocol is the User Datagram Protocol (UDP).

23. A non-transitory computer-readable medium comprising instructions for causing a programmable processor to:

intercept, with an intermediate device, a signaling message exchanged via a signaling session established between a client device and a streaming server when negotiating delivery of a data stream from a streaming server to a client device, wherein the signaling message comprises a setup message that requests the data stream to be sent using a first transport layer protocol by including a transport parameter that specifies the first transport layer protocol as the transport layer protocol to be subsequently used when delivering the data stream from the streaming server to the client device;

dynamically modify the transport parameter in the intercepted setup message to change the transport layer protocol indicated by the setup message between a first transport layer protocol that uses a fixed port assignment and a second transport layer protocol that uses an arbitrary port assignment, so as to specify the second transport layer protocol instead of the first transport layer protocol;

output the intercepted setup message via the signaling session between the client device and the streaming server as a dynamically modified setup message that requests the data stream to be sent using the second transport layer protocol;

intercept the data stream sent from the streaming server to the client device; and convert the data stream between the first transport layer protocol and the second transport layer protocol.

* * * * *